June 27, 1972   C. C. MAYERS   3,673,042
GLASS POLISHING MACHINERY

Filed Aug. 5, 1969   2 Sheets-Sheet 2

INVENTOR:
COLIN CLAYTON MAYERS
by
Beveridge + De Grandi
Attorneys 3,673,042
GLASS POLISHING MACHINERY
Colin Clayton Mayers, Radlett, England, assignor to
Ian Low Smart, London, England
Filed Aug. 5, 1969, Ser. No. 847,686
Claims priority, application Great Britain, Aug. 5, 1968,
37,287/68
Int. Cl. C03c 15/02
U.S. Cl. 156—345    4 Claims

ABSTRACT OF THE DISCLOSURE

A method and apparatus for polishing glassware in which articles of glassware are placed in a vessel, and while remaining in the same vessel, are treated with streams of acid and rinse liquid. The glassware may be treated with detergent and neutralising liquid before and after the treatment with acid.

---

Figure 1:
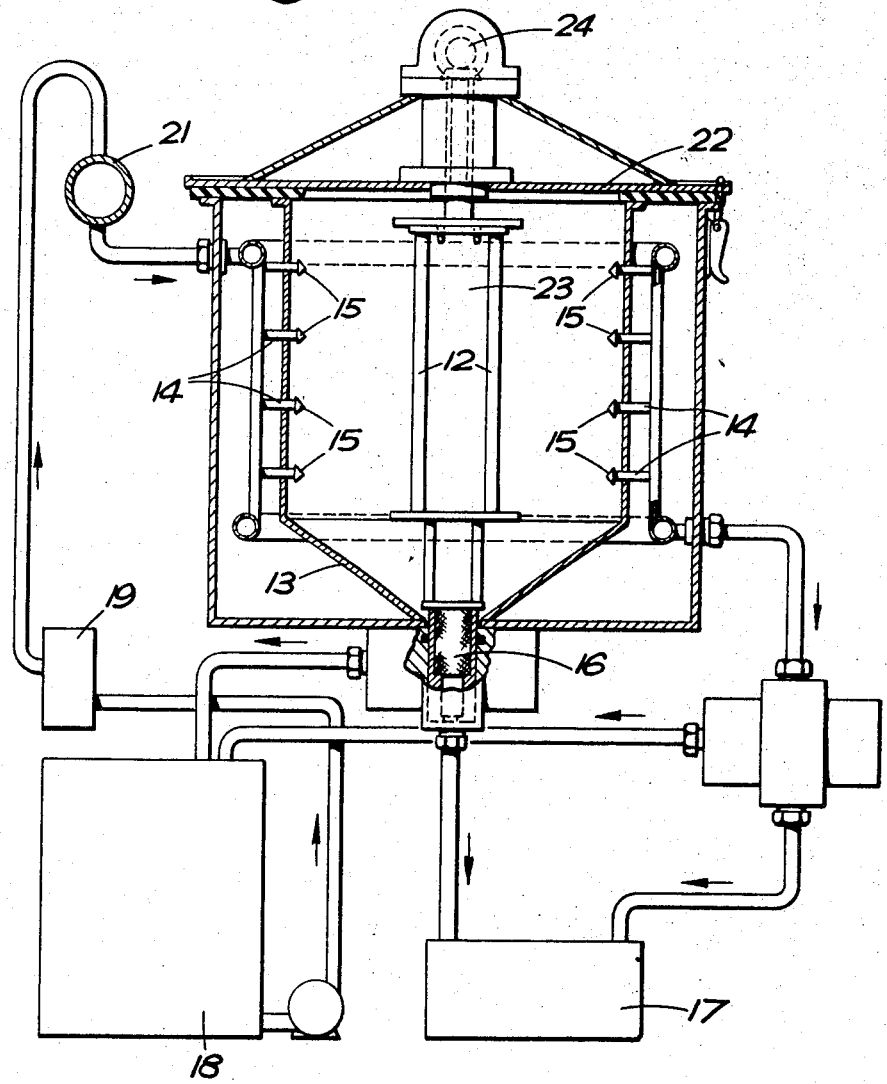

The decoration of table glassware may involve two processes. The first may consist of grinding the necessary pattern out of the surface of the glass by the use of abrasives. The coarse texture left by grinding may then be smoothed away by polishing with acids.

Advantageously only one type of acid may be used to actually attack the glass and dissolve its surface layer so that a new, perfectly smooth flat skin is formed. This acid is hydrofluoric acid; however other acids can be used in the acid polishing mixture, partially to modulate the rate of attack on the glass and partially to react with the dissolved fluorides produced by this attack.

The chemistry of the reactions of hydrofluoric acid with the glass and the subsequent formation of fluorides, hydrofluorsilisilicates and the balance achieved between these compounds and the other acids is complex. A good polish may be readily achieved if the hydrofluoric acid attack on the glass is uniform over its whole surface, otherwise defects such as ripples, "orange-peel" and crystallisation of salts, dissolved in the acid mixture can occur. This is best done by creating turbulence in the acid vat.

The invention relates to a method for polishing glassware by treating the glassware with acid, and to an apparatus therefor.

The invention provides a method of polishing glassware which comprises the steps of placing an article of glassware in a vessel, directing a stream of suitable glass polishing acid over the part of the surface of the article to be polished, and then, while the article remains in the vessel, directing a stream of rinse liquid over at least that part of the article which has been treated with acid.

Preferably a stream of detergent is directed over the article before the article is treated with acid.

It is preferred that a neutralising fluid may be directed over the article after the acid and before the rinse liquid. This neutralising fluid may neutralise acid fumes arising from the acid treatment process. The streams of acid directed over the surface of the article are preferably turbulent.

The invention also provides apparatus for carrying out the method first specified above, which apparatus comprises an acid resistant vessel, means to support a glass article within the vessel, means to supply acid and rinse liquid alternately under pressure to the vessel, means to direct either fluid towards a glass article on the support means and means to allow waste fluid to leave the vessel.

The acid and rinse liquid may be supplied through a common port.

The support is preferably movable within the vessel.

The vessel may be sealed against fluid leakage, and there may be at least one outlet port arranged to exhaust gases from within the vessel.

It is preferred that there are as many fluid sources and sumps as there are different fluids used in the polishing process, and that there is means to transfer fluid from the sumps to supply the sources. In an embodiment in which the sources comprise closed tanks the vessel may be vented to each of the tanks.

The strength of the acid may be monitored by measuring the impedance and density of the acid.

Although the above description relates to the treatment of one article it will be appreciated that a plurality of articles of glassware may be polished simultaneously in one vessel.

Figure 2:
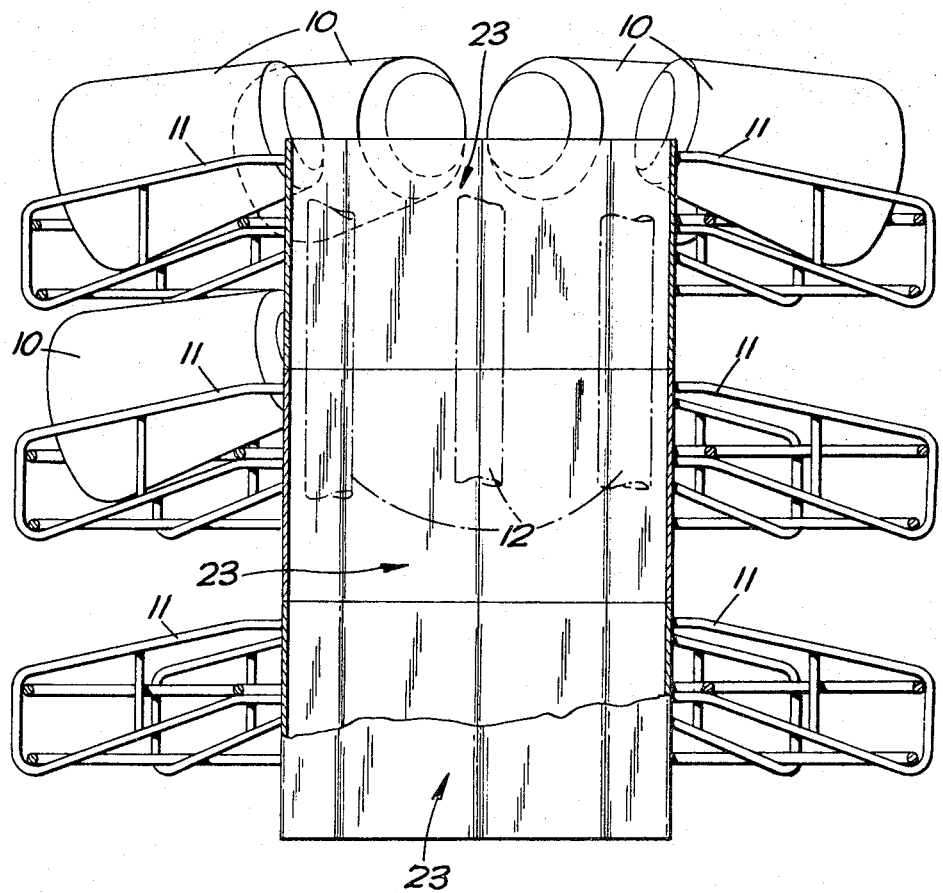

A specific embodiment of the invention will now be described by way of example, with reference to the accompanying drawings of which:

FIG. 1 is a diagrammatic cross-sectional view of a glass polishing apparatus; and FIG. 2 is a side view of a glass carrying basket for use in such an apparatus.

Articles of glassware, such as glasses 10, are first stacked on to recessed wire trays 11 that can rotate about a central column 12 of a cylindrical, gas tight vessel 13 in much the same way that glasses would be placed in a domestic dishwasher. The vessel is equipped with inlet ports 14 and spray nozzles 15 through which the liquids pass to enter it, and the vessel also has a large outlet port, leading through a filter bag 16 to a sump 17. The liquids themselves are stored in seven smaller tanks 18, of which only one is shown for clarity. These tanks are connected to the vessel through a seven way selector valve, a ring main 21, and a system of pipes and valves. The sump (or sumps, as there is an advantage in using one sump for acids and another for less corrosive liquids) is (or are) similarly connected to the tanks, via pumps.

In this apparatus, the glasses undergo the following processes:

Firstly, a washing in a water/detergent mixture to remove grease etc.

Secondly, a sluicing with a "spiking" acid to condition the surface of the glass.

Thirdly, the main acid attack.

Fourthly, a sluicing with a neutralising solution to remove traces of acid.

The glasses are then given two or three washings in ordinary water, followed by a lime free water wash.

Finally, the glasses are subjected to air drying.

The fumes produced by the acid processes are collected above the liquid level in the vessel and are neutralised by the neutralising wash, thus obviating or reducing the need for special fume extraction and neutralising gear. The desirable turbulence is produced in the vessel 13 by the combination of the rotary motion of the glasses and the positioning of the spray jets 15. The insoluble sulphates formed can be collected in a filter bag 16 above a sump, and the acid tank itself (i.e. one of the tanks 18) contains monitoring equipment to measure the acid strength. The monitoring of this acid will include the measurement of two of its properties, namely its impedance, by passing radio frequency electromagnetic waves through it, and its density, possibly by using ultra-sonic means. The impedance measurement will give an indication of the acidity of the liquid and the density measurement will enable an observer to differentiate between the hydrofluoric acid present and other, denser, acids. Light, plastic coated wire baskets (as shown in FIG. 2) are slotted onto a holder 23 which fits into a large octagonal hole in their centre. The holder consists of four tubular columns which engage four of the internal angles with the hexagon. When three or four baskets are so loaded the glass is prevented from falling out, however fierce the agitation. The holder is clipped onto an agitating device 24, which is integral with the lid of the main vessel and is held in place by a guide ring on the filter bag 16 suspended beneath the holder. Both the glass baskets and the filter bag can be removed very quickly from the holder at the end of the polishing sequence.

The glasses are placed inside the vessel by removing a hatch 22 on top of it, and are first loaded into the "core" of baskets which is simply lowered into position through this hatch. To prevent "carry over" of water into the acid, a brief spraying with acid can take place between the first and second processes, the effluent being simply discharged as waste and not mixed with the acids in the "spiking" tank. Finally, it will be easy for workmen to top up both the acid and wash liquor tanks (i.e. tanks 18) without exposing themselves to the dangers associated with fumes and splashings that are found in the conventional acid polishing plants.

I claim:

1. An apparatus for polishing glassware comprising an acid resistant vessel, in which there is means to support an article of glassware, means to supply acid and rinse liquid alternately under pressure to the vessel, means to direct either of said fluids towards a glass article on said support means, common exit port means to allow waste fluids to leave said vessel, said support means comprising a hollow tubular member having a longitudinal axis and having baskets for supporting said glass articles on its outside tubular surface, and power driven agitating means for rotatably agitating said support means about said longitudinal axis, said support means being removably attached to said agitating means.

2. The apparatus claimed in claim 1 wherein said support means comprises a polygonal tubular member and further includes a plurality of column members which engage said hollow tubular member on its inside surface.

3. An apparatus for carrying out a method of polishing glassware which include the steps of placing an article of glassware in a vessel, directing a stream of suitable glass polishing acid over part of the surface of said article and then, while the article remains in said vessel, directing a stream of rinse liquid over at least said part of said article, which apparatus comprises an acid resistant vessel, means in said vessel to support an article of glassware, means to supply acid and rinse liquid alternately under pressure to the vessel, spray nozzle means to direct either of said liquids towards said article on said support means and means to allow waste fluid to leave the vessel, a ring main being arranged for selective connection to each of the means to supply acid and rinse liquid, said spray nozzle means being connected to the ring main, said support means being a glass holder formed of a plastic coated wire cage having a central cavity adapted to engage at least three spaced tubular members, and said means to allow waste fluid to leave including a filter bag arranged to collect insoluble products of the glass polishing process from the interior of the vessel.

4. An apparatus as claimed in claim 3 further including means to monitor the strength of the acid used, said means including means to measure the impedance of the acid.

References Cited
UNITED STATES PATENTS

| 1,166,378 | 12/1915 | Levy | 156—8 X |
| 2,036,647 | 4/1936 | Achauer et al. | 156—25 X |
| 2,308,350 | 1/1943 | Blackburn | 156—25 X |
| 3,405,720 | 10/1968 | Carlson | 156—345 X |
| 3,437,543 | 4/1969 | Winings | 156—345 |
| 3,203,434 | 8/1965 | Kipp et al. | 134—147 X |

WILLIAM A. POWELL, Primary Examiner

U.S. Cl. X.R.

134—148, 151, 155, 200; 156—25